US008892720B2

(12) United States Patent
Diaz

(10) Patent No.: US 8,892,720 B2
(45) Date of Patent: *Nov. 18, 2014

(54) SYSTEM AND METHOD FOR NETWORK OPTIMIZATION THROUGH PREDICTIVE DOWNLOADING

(75) Inventor: Raul Diaz, Palo Alto, CA (US)

(73) Assignee: ArcSoft, Inc., Fremont, CA (US)

( * ) Notice: Subject to any disclaimer, the term of this patent is extended or adjusted under 35 U.S.C. 154(b) by 598 days.

This patent is subject to a terminal disclaimer.

(21) Appl. No.: 12/370,462

(22) Filed: Feb. 12, 2009

(65) Prior Publication Data

US 2010/0205292 A1 Aug. 12, 2010

(51) Int. Cl.
*G06F 15/173* (2006.01)
*H04L 12/40* (2006.01)

(52) U.S. Cl.
CPC ................................. *H04L 12/40013* (2013.01)
USPC ........... 709/224; 709/220; 709/218; 709/223; 709/227

(58) Field of Classification Search
USPC .......................... 709/224, 220, 218, 223, 227
See application file for complete search history.

(56) References Cited

U.S. PATENT DOCUMENTS

| 5,790,536 | A | 8/1998 | Mahany et al. |
| 6,675,212 | B1 | 1/2004 | Greenwood |
| 6,678,252 | B1 * | 1/2004 | Cansever ..................... 370/253 |
| 7,480,707 | B2 | 1/2009 | Morlitz |
| 7,577,949 | B2 * | 8/2009 | Barr et al. ..................... 717/169 |
| 2001/0021942 | A1 | 9/2001 | De Bot et al. |
| 2002/0198991 | A1 * | 12/2002 | Gopalakrishnan et al. ... 709/225 |
| 2003/0110293 | A1 | 6/2003 | Friedman et al. |
| 2005/0243862 | A1 | 11/2005 | Krishnan |
| 2006/0002532 | A1 * | 1/2006 | Horvitz et al. ........... 379/112.01 |
| 2006/0129670 | A1 * | 6/2006 | Mayer ........................... 709/223 |
| 2007/0124464 | A1 * | 5/2007 | Lean et al. .................... 709/224 |
| 2007/0177625 | A1 * | 8/2007 | Morinaga et al. ............ 370/468 |
| 2008/0031136 | A1 * | 2/2008 | Gavette et al. ............... 370/235 |
| 2009/0271577 | A1 * | 10/2009 | Campana et al. ............ 711/137 |
| 2009/0310485 | A1 * | 12/2009 | Averi et al. ................... 370/232 |
| 2010/0202287 | A1 | 8/2010 | Diaz et al. |

* cited by examiner

Primary Examiner — Lan-Dai T Truong
(74) *Attorney, Agent, or Firm* — Patent Law Group LLP; David C Hsia

(57) ABSTRACT

As more internet service providers have more customers with high-speed internet access accounts and these customers access more multi-media rich data (such as videos), the network infrastructure of internet service providers becomes saturated. Thus, internet service providers are facing pressure to upgrade their networks. Thus, internet service providers need to optimize the usage of their existing networks. To optimize the usage of existing networks, a system of performing predictive downloading for data caches is proposed. The system for performing predictive downloading examines network traffic conditions and does not issue predictive download requests if the network is busy. By restricting predictive downloads to times when the network is not busy, the system utilizes an under used resource. Accurate predictions will reduce future network traffic. Incorrect predictions cause no harm since the transfers only occur when free network bandwidth is available.

19 Claims, 5 Drawing Sheets

SYSTEM AND METHOD FOR NETWORK OPTIMIZATION THROUGH PREDICTIVE DOWNLOADING

RELATED APPLICATIONS

The present patent application is related to the patent application titled "SYSTEM AND METHOD FOR NETWORK OPTIMIZATION BY MANAGING LOW PRIORITY DATA TRANSFERS" having Ser. No. 12/370,328 filed concurrently with this application and hereby incorporates it by reference in its entirety.

TECHNICAL FIELD

The present invention relates to the field of digital communication networks. In particular, but not by way of limitation, the present invention discloses techniques optimizing the network usage through the use of predictive downloading.

BACKGROUND

The global internet has become a standard telecommunication system in modern life. The internet provides telecommunication means such as email, voice over internet protocol (VOIP) telephony, and video conferencing. The internet acts as a mass media communication network by offering a wide variety of media such as news websites, entertainment websites, downloadable music, downloadable video, and digital media forms. The internet also offers services such as investment services, banking, computer services, and internet gaming. The internet even provides a convenient means of obtaining physical products through the use of online merchants and auction sites.

Most homes and businesses in the United States of America now have some form of internet access. Initially, most homes relied upon relatively slow dial-up analog modem lines to access the global internet. But more recently, higher-speed forms of internet access as provided by digital subscriber lines (DSL), cable modems, and wireless network connections are becoming increasingly common. These higher speed forms of internet access allow homes and businesses to access rich multi-media web sites that include images, audio, and video. Due to the large amount of data required to store a representation of an image, some internet analysts believe that most internet packets are now carrying some form of image information (in the form of web site graphics, video, photographs, etc.).

As users are increasingly accessing greater amounts of information by downloading data-intensive items such as video, internet service providers (ISPs) are being pressured to upgrade their data networks in order to handle these rapidly growing data demands. The high costs of upgrading data networks can adversely affect the profit margins of internet service providers. This is especially true when the internet service providers are being pressured to increase data network capacity without receiving greater revenues in the form of internet access subscriber fees. Thus, internet service providers have a great incentive to optimize the usage of their existing data network investments such that internet subscribers continue to receive high-quality internet service and costly data network upgrades can be deferred.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to an internet service provider, the teachings can be used in many other environments. For example, a cellular telephone network service provider may use the teachings of the present disclosure to optimize data transfers to cell phones or other wireless devices on a cellular telephone network. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
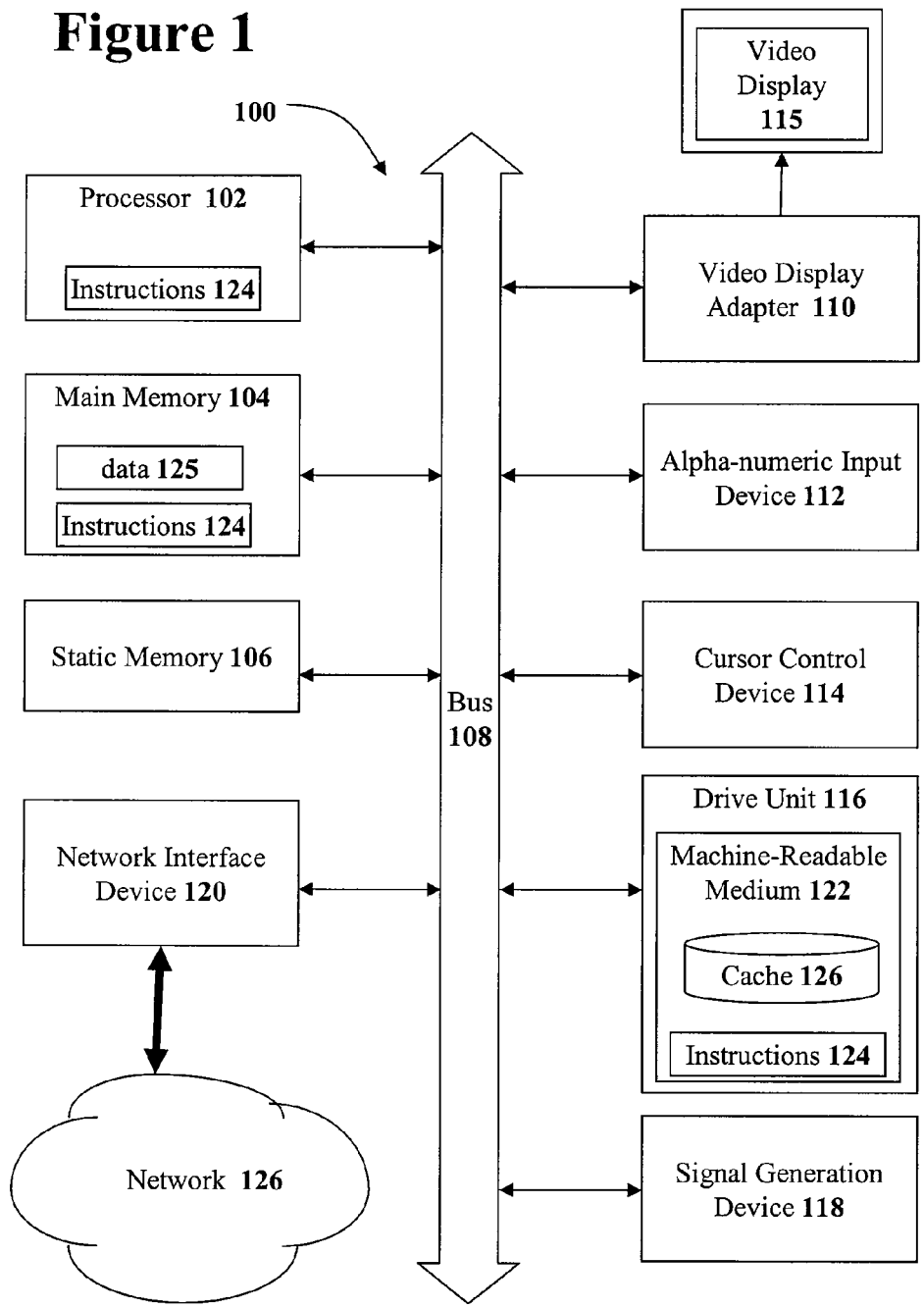
FIG. 1 illustrates a diagrammatic representation of a machine in the example form of a computer system, within which a set of instructions for causing the machine to perform any one or more of the methodologies discussed herein, may be executed.

The present disclosure concerns digital computer networks and computer systems. FIG. 1 illustrates a diagrammatic representation of a machine in the example form of a computer system 100 that may be used to implement portions of the present disclosure. Within computer system 100 of FIG. 1, there are a set of instructions 124 that may be executed for causing the machine to perform any one or more of the methodologies discussed within this document.

In a networked deployment, the machine of FIG. 1 may operate in the capacity of a server machine or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network server, a network router, a network switch, a network bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 of FIG. 1 includes a processor 102 (e.g., a central processing unit (CPU), a graphics processing unit (GPU) or both), a main memory 104 and a static memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120. Note that not all of these parts illustrated in FIG. 1 will be present in all embodiments. For example, a computer server system may not have a video display adapter 110 or video display system 115 if that server is controlled through the network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 may further be transmitted or received over a computer network 126 via the network interface device 120. Such transmissions may occur utilizing any one of a number of well-known transfer protocols such as the well known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Network Caching

Historically, in an effort to improve the performance of client applications that need to access to data over a network, data caches have been implemented. A data cache is a memory system filled with data that has been accessed in the past and may be accessed again in the future. Having a data cache allows a system to reuse previously fetched (and cached) network data without retransmitting a request for the data and the data response across the network when the same data is requested again.

One of the most common examples of a data cache for internet systems is the data cache within an internet browser. An internet browser cache stores the data elements, such as text and images, of recently accessed web pages on a local hard disk and/or local program memory. In this manner, the internet browser does not need to repeatedly request the same data items that are used over and over again. For example, a particular company may place a company logo image in a corner of their web site pages. By caching the company logo image, the internet browser will not repeatedly request that same company logo image since it will already be stored within the internet browser's cache. Thus, an internet browser data cache reduces network traffic.

Data caching can also be performed on higher levels. For example, an intermediary node with a data cache may be placed between a server node and numerous terminal nodes that the server provides data to. In this manner, the data cache at the intermediary node may cache data in order to reduce the number of times the same data is requested by and transmitted to multiple different terminal nodes. Data caches can also be cascaded up to the penultimate nodes before the terminal nodes in a technique called Edge Servers or Edge Caches. This technique allows multiple terminal nodes to request the same data repeatedly without burdening the rest of the network with retransmissions of data.

Predictive Downloading and Caching

While the caching of network data improves client performance while simultaneously reducing network traffic, this approach does not help with network data that has not yet been accessed. As a result, other techniques have been developed to predictively download data that a network client might need in the future. Since the prediction of future data needs is generally extremely difficult and inaccurate, most of the these types of predictions have concentrated on downloading a large quantity of algorithmically adjacent data in the hopes that the algorithm used improves the client's application performance. Since a relatively large amount of data has to be downloaded using this technique, the effects on the network traffic can be considerable and can cause network traffic congestion. Thus, this technique may actually decrease overall client application performance and responsiveness if too many client applications perform this same type of predictive downloading function such that the network becomes overloaded.

An example of algorithmic adjacency can be provided with reference to internet web browsers. Specifically, one common type of predictive downloading is performed by internet browsers that examine previously downloaded web pages and then attempt to download the web pages referenced by these previously downloaded web pages. In effect, the internet web browser is downloading the landing pages of some or all of the links in the previously downloaded pages. Thus, if the user clicks on a link in a currently displayed web page, the internet web browser may have already downloaded and cached that web page in an earlier predictive download such that the internet web browser can immediately retrieve that web page from the data cache display that web page.

In the internet web page predictive downloading system described in the preceding paragraph, the algorithm selects new web page data to download that is referenced by web page data currently stored on the client system. Unfortunately, this algorithm's ability to predict actual future data needs relies on the relatively faulty assumption that references from current data are highly correlated to future data needs. In the particular case of internet web browsers, it is rare that a user will click through all the links on a particular web page. The user may select one of the links on the web page or the user may elect to view an entirely different web page that is selected using other tools such as bookmarks, toolbar buttons, or recommendation engines such as StumbleUpon, Digg, and others. Thus, the bandwidth usage cost of predictive downloads in this situation to the network itself and the request servicing cost to the originating web servers will generally exceed the benefit since the downloaded data is unlikely to be consumed.

If the type of predictive downloading described above is being performed on many clients or at busy network traffic times, then the overall performance for originating web servers, network routers and network terminal clients can be dramatically reduced. As a result, this type of predictive downloading and network bandwidth optimization can generally be considered to be in opposition to each other (the more of this inaccurate predictive downloading, the more network bandwidth and server capacity will be consumed). Although this predictive downloading may improve the performance of some client applications in some circumstances, the cost of the performance improvement is generally higher, possibly even dramatically higher, than the gain in improved performance. Thus, the network bandwidth utilization and increased costs for originating servers tends to negate the advantages of this type of predictive downloading.

Network Performance Issues

When a data networks begin to experience heavy traffic loads, those heavy network traffic loads may cause some data packets to be dropped or delayed. To minimize the harmful effects of such network traffic, modern routers and servers cooperate using advanced protocol signalling to determine the relative priority of different data packets. In this manner, the network can make informed decisions as to which data packets should be delayed or dropped if the network traffic becomes too heavy. For example, Quality of Service (QoS) is a set of techniques, protocols, and algorithms designed to provide for multiple approaches to prioritizing data packets. Quality of service techniques include priority queuing (PQ), custom queuing (CQ), weighted fair queuing (WFQ), class-based weighted fair queuing (CBWFQ), multiple bandwidth reservations, and other techniques all of which are thoroughly described in data networking literature. For example, Chapter 49 of the Cisco Internetworking Technology Handbook contains a discussion of quality of service techniques that are implemented within Cisco routers.

Data networks with multiple servers and multiple clients, including local area networks and the internet, require these quality of service techniques to efficiently deliver data between the various network nodes. The techniques for efficient network usage are particularly important when data networks are being used to transfer audio, video, and other real-time media wherein an interruption of the data stream will cause pauses, freezes, and other undesirable artifacts. Because of variations of data traffic between nodes based on variations in the types of data requests and the amount of data requests, the data transfer requests at any given moment may exceed the available bandwidth of the network such that data transfers will be delayed or dropped. It is as such times that quality of service techniques are used to prioritize data packets and optimize network usage in order to provide the best outcome.

However, at other times the amount of data transfer requests outstanding may be less than the available bandwidth. For example, at night time when most humans are sleeping, the amount of data requests on a network tend to be quite low. At such times of low demand on the network, network data traffic during this period may be insufficient to use the available network bandwidth or will only use the available network bandwidth in short bursts. Thus, such times of low demand leaves potentially long periods of time in which the available network bandwidth is underutilized.

Since data networks are designed and built to provide a predetermined maximum data throughput (or bandwidth), any periods that the network is not transmitting at peak capacity can be considered inefficiencies of network usage from the point of view of those bearing the cost of constructing the network. (Or from the point of view of an entity that pays to use specific bandwidth from the network.). Ideally, all of the available network bandwidth would be used at all times to obtain a maximum return on investment. Obviously, this is not possible since network bandwidth needs tend to be variable and difficult to predict. If one attempts to increase network utilization by simply increasing data transfer demands then the total demand for data transfers will eventually exceed the available network bandwidth such that the quality of service between nodes will suffer. Specifically, data packets will arrive later than needed or may even be lost. This is not acceptable for some applications such as when real-time data is being transmitted.

Data Caching, Predictive Downloading, and Opportunistic Data Transfer

As set forth in the preceding sections, data caching works well for reducing network traffic but it only operates on data that has already been transferred. Predictive downloading can be implemented in attempts to cache additional data that may be needed but this technique tends to reduce network performance by filling the data network with additional data requests and data transfers that may overload the network. Furthermore, the additional data obtained using predictive downloading will often never be used such that the additional requests and data transfers may clog up the network without any added benefit. In order to obtain an added benefit, the present disclosure proposes combining data caching and predictive downloading along with a technique known as opportunistic data transfer.

As set forth earlier, there are periods of time when the data traffic on a network tends to be low. To take advantage of these times, data transfer time-shifting may be used. Data transfer time-shifting is the practice of moving data transfers from times of peak network demand times of reduced network demand in order to improve the efficiency of a data network. There are currently few systems that use the technique systematically moving data transfer requests from times of peak or high network demand to periods of expected low network demand. One system that uses this technique is the use of scheduled data transfers. Scheduled data transfers are often used for data that is generated in a cyclical or repetitive basis and needs to the transferred to another location. Another use of scheduled data transfers is for explicit data transfer scheduling such as subscriptions to data or media services. In both of these cases, the scheduled data transfer can be programmed to occur at a period when network traffic is expected to be low. However, even if one shifts a data transfer to a time when one expects network data traffic to be low, the data traffic at that time may actually be high such that network overload may still occur.

Most networks are designed and built for a specified peak bandwidth amount, the largest amount of data traffic expected to occur. Thus, at any time other than the peak network usage, there is a unused bandwidth that is not being utilized. Any additional data transfers made during such times of low network demand can be considered "free" since those additional data transfers are using an underutilized resource that would otherwise be wasted.

If predictive downloads into a data cache can be made to occur during these "free" data transfer periods, such predictive downloads will generally be beneficial. Specifically, any predictive download into a data cache that turns out to be a correct prediction will reduce data transfers in the future. Similarly, predictive downloads into a data cache for incorrect predictions will result in needless data transfers during these "free" periods. (This document will refer to times of available unused bandwidth as "free periods".). But since such needless data transfers associated with incorrect predictions occur only during free periods, these incorrect predictive downloads have no negative effects on the network performance. There is only a net benefit (in the form of reduced network traffic) when correct predictions are made. Thus, even relatively inaccurate predictive downloading into data caches will still provide a beneficial decrease in peak network traffic loads without any additional cost. Accurate predictive downloading into data caches will significantly improve the network performance since a larger amount of network traffic will be handled at off peak times. In addition, the quality of service at network terminals will appear much improved since the requested data will appear to be instantly available at the network terminal.

To the extent that predictive downloads during these free periods accurately predict actual future data download requests, then the combination of network load monitoring with predictive downloading of cache data results in a reduction of data transfers that is proportional to the accuracy of the prediction times the total size of predicted data transferred. Therefore, the accuracy of the prediction is directly proportional to the improvement in network bandwidth efficiency.

In order to have predictive downloading for data caches occur at these free periods, the present disclosure introduces the concept of an "opportunistic data transfer". An opportunistic data transfer is a data transfer that occurs during a free period. Specifically, the present disclosure introduces a system that monitors the network conditions in order to determine when these free periods are likely to be available. Then, during these free periods, the system of the present disclosure attempts to make an opportunistic data transfer. When the system correctly determines when a free period is available, the data transfer will occur. If the system attempts an opportunistic data transfer during a time that is not actually a free period, that data transfer will be delayed or ignored. The system may also be instructed to adjust its free period determination system.

Embodiment Overview

For the various embodiments a case of a generic data network will be considered. The data network will generally comprise a set of servers that provide data and services, a set of data links that connect the various network nodes, a set of routers that manage data traffic areas where data links connect, and a set of client systems (also known as terminal systems) that make data and service requests to servers.

The data network may be a computer network that operates using standard internet (TCP/IP) network protocols. In such a case, the servers are computer server systems (such as web servers, mail servers, etc.), the routers are internet protocol based routers, the client systems are generally personal computer systems, and the data links are communication links that connect the various network nodes (the servers, routers, and clients) together. An internet service provider provides a good example of a typical internet based network. An internet service provider has a set of routers that couple to other internet service providers and internet backbone locations. An internet service provider also has their own internal network consisting of routers, hosted servers, and communication links. And an internet service provider has a set of customer communication lines that couple to customer terminal systems or customer networks.

Note that any generic data network may use the teachings of the present disclosure. For example, a digital cellular telephone network constructed of digital communication lines, cellular base stations, and a plurality of independent digital cellular telephones (terminal systems) may use the teachings of this disclosure.

Figure 2:
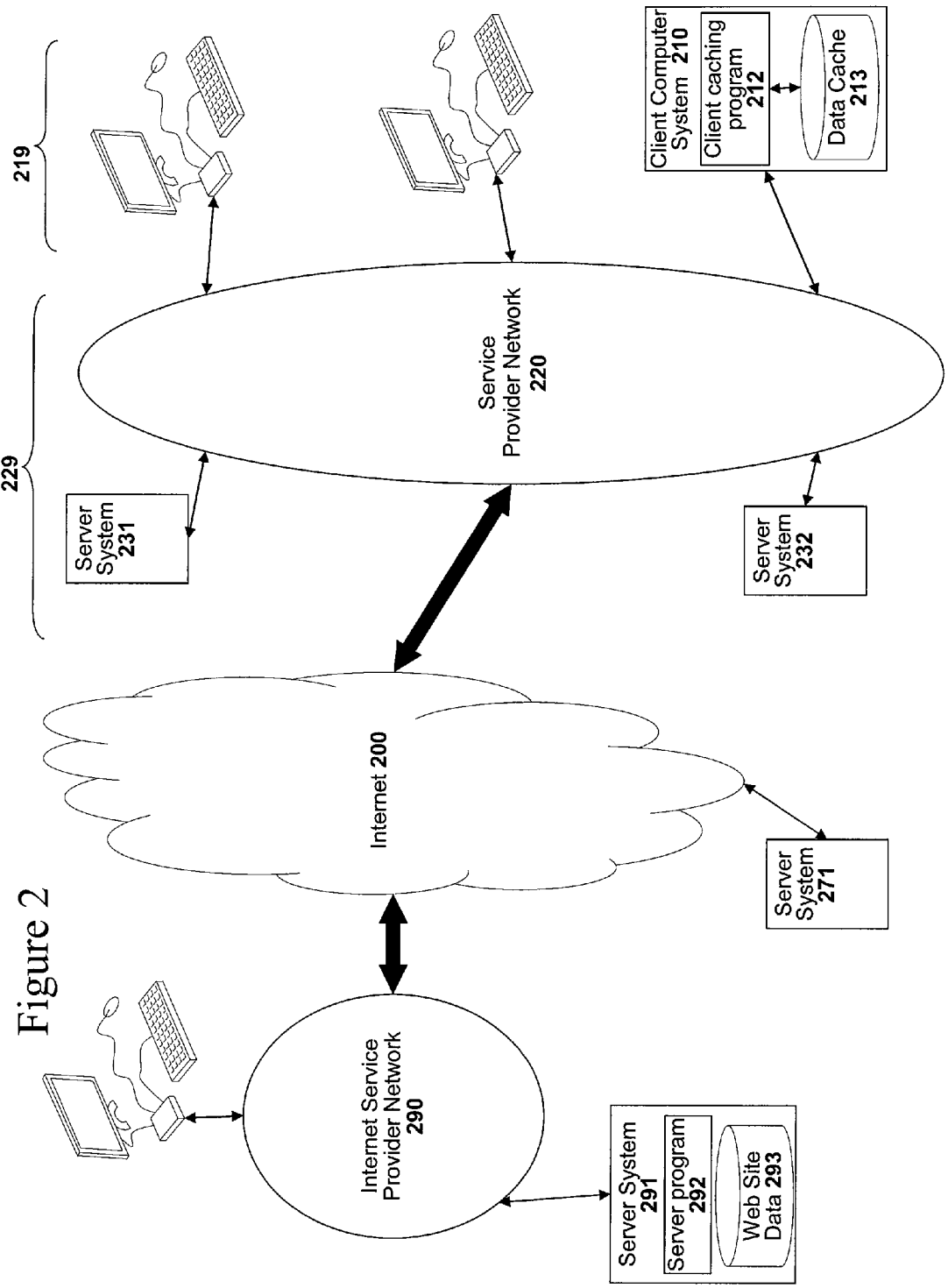
FIG. 2 illustrates a conceptual diagram of an example network system that may use the teachings of the present disclosure.

FIG. 2 illustrates a conceptual diagram of an example network system that may use the teachings of the present disclosure. On the right of FIG. 2 are a set of client systems (or network terminals) 219. The client systems 219 get data network service from a network service provider 229. The network service provider 229 operates their own network 220 and connects to the client systems 219 using various communication links. If network service provider 229 is a typical internet service provider (ISP), the communication links to the client systems 219 may be digital subscriber lines, cable modem lines, dial-up analog modem connections, a wireless digital connections (such as WiMax), or any other suitable digital communication means.

The client systems (or network terminals) 219 generally request data (email messages, web pages, and rich media content such as audio, video and animations) from originating servers. The servers may be directly on the network 220 of network service provider 229 such as server systems 231 and 232. Such servers reside within a physical installation of the network service provider 229 such a co-location facility. Alternatively, the originating servers (such as servers 271 and 291) may reside at other locations that are accessible from the service provider network 229. In the case of the Internet, external originating servers can be connected to any network that is itself connected to network 220 via the Internet protocols. In FIG. 2, an example of this is server system 291 that is on network 290 which is connected through other networks to network 220 with internet protocols (TCP/IP). This is illustrated as a connection through internet 200 since the internet is defined as a "network of networks" that all use the TCP/IP protocols.

All networks generally exhibit some cyclical patterns of use. For example, there will generally be daytime and nighttime variations or weekday and weekend variations in network usage. These variations in network usage that will affect network bandwidth efficiency. Even shorter period variations such as hourly variations or even more frequent variations will cause bandwidth inefficiencies. The system of the present disclosure will take advantage of these network usage variations.

One must note that not all data links within a network provide the same bandwidth. While internal backbone connections may use digital glass fiber to handle numerous and massive data transfers between different network providers and within a network provider itself, the connections to client systems tend to be much smaller. Individual client systems may be connected wirelessly or through other relative narrower-band connections. For example, the wired network of a cellular telephone provider will be constructed with very high-speed data links but the connections to individual cellular telephones may be very limited when many cellular telephone users are using their cellular phones simultaneously. Thus, there will exist situations in which certain portions of a particular network may be underutilized while other portions are experiencing traffic overloads. For example, a network backbone may be under utilized while connections closer to the edge of a network are overloaded with data traffic and data traffic requests from many simultaneous users. This can be a very delicate situation for client systems that share bandwidth such as wirelessly connected computers or cellular telephones. Traffic overloading in shared bandwidth situations will cause degraded quality of service when attempting to deliver many types of data including real-time audio and video data to those client systems sharing bandwidth. The teachings of this disclosure will carefully handle such situations such that predictive downloads will not cause such situations nor aggravate those situations.

A First Embodiment

Figure 3:
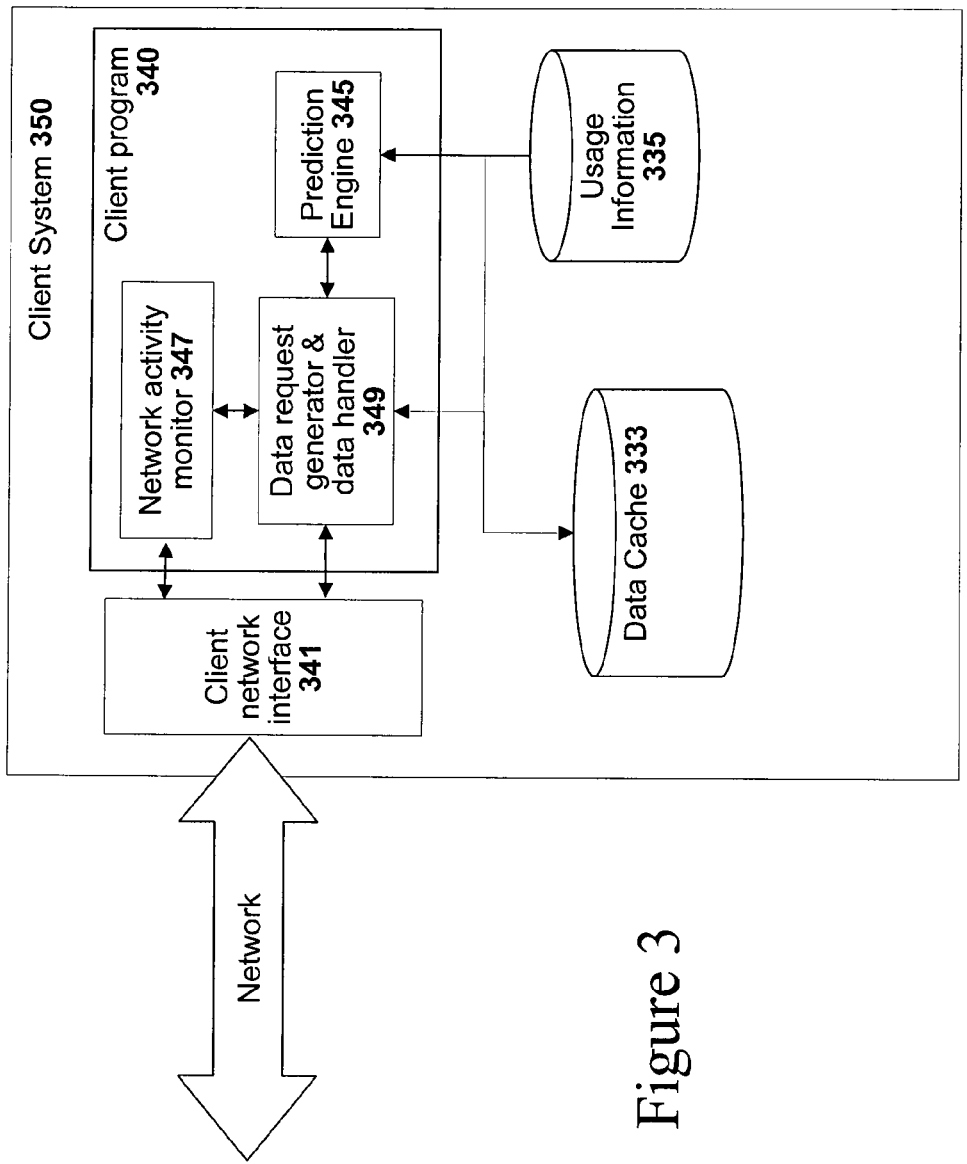
FIG. 3 illustrates a conceptual diagram for a client caching program in a first embodiment.

FIG. 3 illustrates a block diagram of a client system 340 in a first embodiment. Referring to client system 340, a client caching program 340 determines when an opportunistic transfer request should be made for the purpose of issuing a predictive download request to obtain data for a data cache 333. The client caching program 340 of FIG. 3 contains a network activity monitor 347, a prediction engine 345, and a data request generator & data handler 349. Each component of the client caching program 340 will be described in detail.

The network activity monitor 347 couples to the client network interface 341 and measures the client system's network activity. The network activity monitor 347 may use internal data traffic models to determine when free periods are available. In some embodiments, the network activity monitor 347 downloads new data traffic models from specific network servers. When the network activity monitor 347 determines that the network activity level is low or expected to be low the network activity monitor 347 informs the data request generator and data handler 349 that it should issue a predictive download data request. Some upstream network node may reject a predictive download data request due to heavy network traffic and send a response back to the client system 350. When this occurs, the network activity monitor 347 may incorporate that information into is data traffic models.

Data request generator and data handler 349 performs the task of issuing predictive download data request messages and handling responses to those requests. The data request generator and data handler 349 has two primary inputs to control its activities. A first input comes from the network activity monitor 347 which determines when there may be a free period when predictive download requests should be issued. A second input comes from the prediction engine 345 which provides specific information on what data should be requested from a server in order to reduce future network traffic. When the data request generator and data handler 349 receives a response to an issued data request, the data request generator and data handler 349 stores the received data into a data cache 333. Data cache 333 in FIG. 3 represents one or more data caches that various applications run on client system 350 may access. For example, data cache 333 may represent a network newsfeed cache, a world wide web browser cache, a streaming video cache, and any other type of data cache that may be useful.

Prediction engine 345 is responsible for making predictions on what data should be downloaded and stored in data cache 333 in order to best reduce future data requests from client system 350. Thus, the prediction engine 345 may supply the data request generator & handler 349 with predictions of data most likely be accessed by the user of the client system 350. Prediction engine 345 may receive information from various different sources to help make these predictions.

One very important source of information for the prediction engine 345 is usage information 335 that describes how the client system 350 has been used in the past. This usage information may describe which network applications (applications that access data on the network) a user of client system 350 uses and how much each network application is used. For each network application, the usage information 335 may describe particular network locations that are frequently accessed by the user. For example, the Uniform Resource Locators (URLs) of particular web sites frequented by the user of client system 350 may be stored in usage information 335. In addition to the usage information 335, prediction engine 345 may also use data already stored in the data cache 333. For example, the prediction engine 345 may predict that the user will wish to view other information related to information already stored in the data cache 333. The prediction engine 345 may even receive information from remote servers. For example, a remote server may issue updates such as RSS feeds that specify updates to a particular web site. The prediction engine 345 may use this information to issue data requests for the updated information at web sites that the user is interested in. Note that these are just a few examples of information that may be accessed.

Numerous different heuristics and algorithms may be used by the prediction engine 345 in order to make predictions of data that should be cache. These techniques may include:

- Most recently used (MRU) or most recently accessed data. For example, the web sites most recently visited may be visited again.
- Most frequently accessed data. For example, if a user access particular web pages over and over again, those web pages are likely to be visited again.
- Data referred to by data already downloaded. For example, the prediction engine 345 may access information from web pages specified by links in web pages already stored in the data cache 333.
- Analysis of specific server structures to determine "popular" or frequently downloaded data. For example, certain web sites provide users with lists of popular data items, items often emailed to others, and suggested
- Analysis of the downloaded data to determine most accessed types of data. For example, one user may be particularly interested in digital online videos These and other techniques are used by the prediction engine 345 to provide data requests to the data request generator & handler 349. Note that the suggestions being generated may be time dependent since the user may view different types of data at different times of the day such that the data request generator & handler 349 may only ask for data request when it has been informed by the network activity monitor 347 that a free period may be available.

Referring back to FIG. 2, an example of a client computer system 210 with a client caching program 212 is illustrated in the lower right-hand corner. This caching system can operate with existing network equipment and servers in order to reduce the traffic on the service provider network 220. However, with additional help, the system can be made even more efficient.

A Second Embodiment

Figure 4:
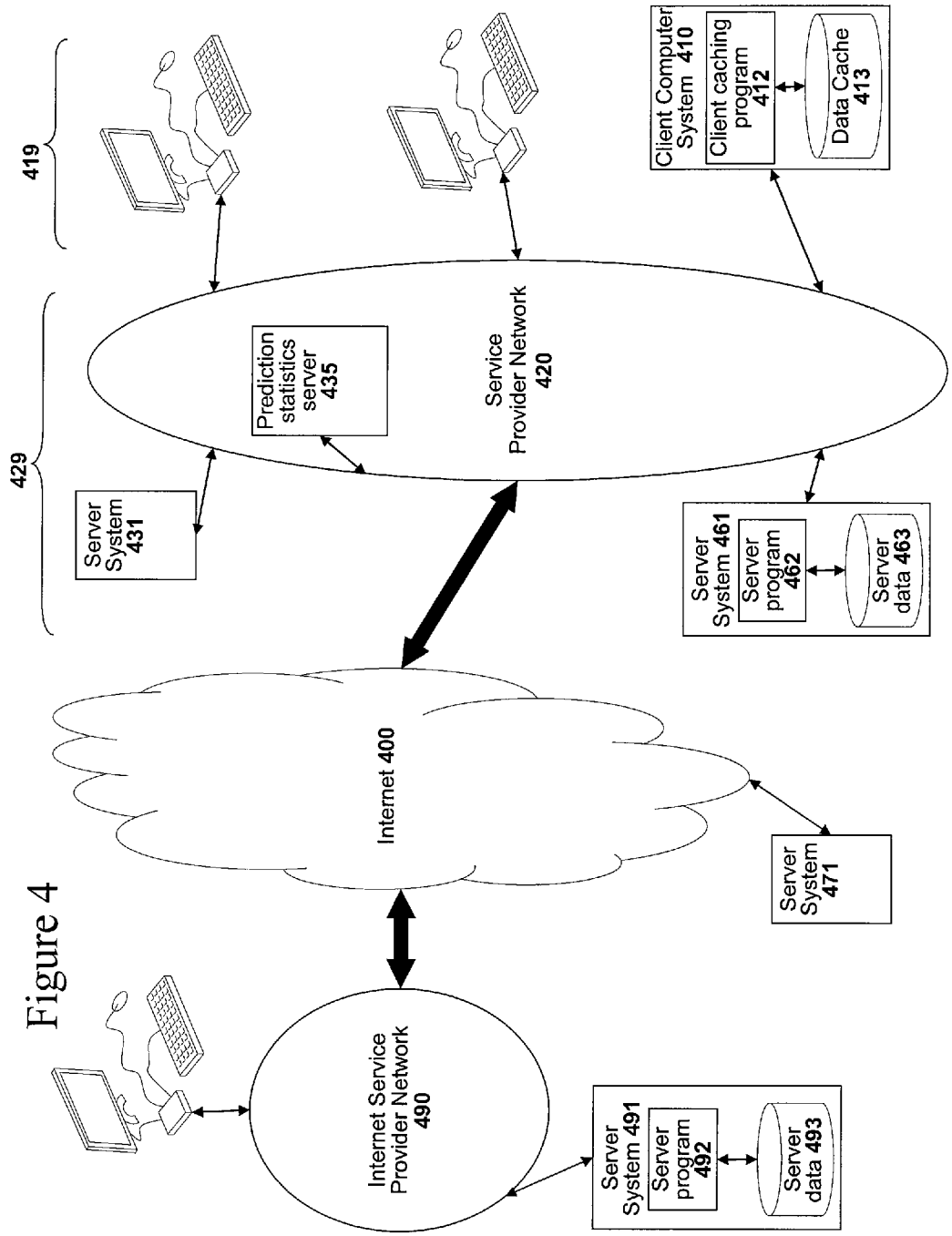
FIG. 4 illustrates a conceptual diagram of a second embodiment wherein server systems interoperate with the client caching program.

FIG. 4 illustrates a conceptual diagram of a second embodiment. The second embodiment is similar to the first embodiment but adds a server program on one or more server systems that has been designed to interoperate with the client caching program to further improve performance. In one embodiment, the client caching program 412 and the server program 462 interoperate using a new communications protocol designed to further reduce traffic on the network during peak times.

Figure 5:
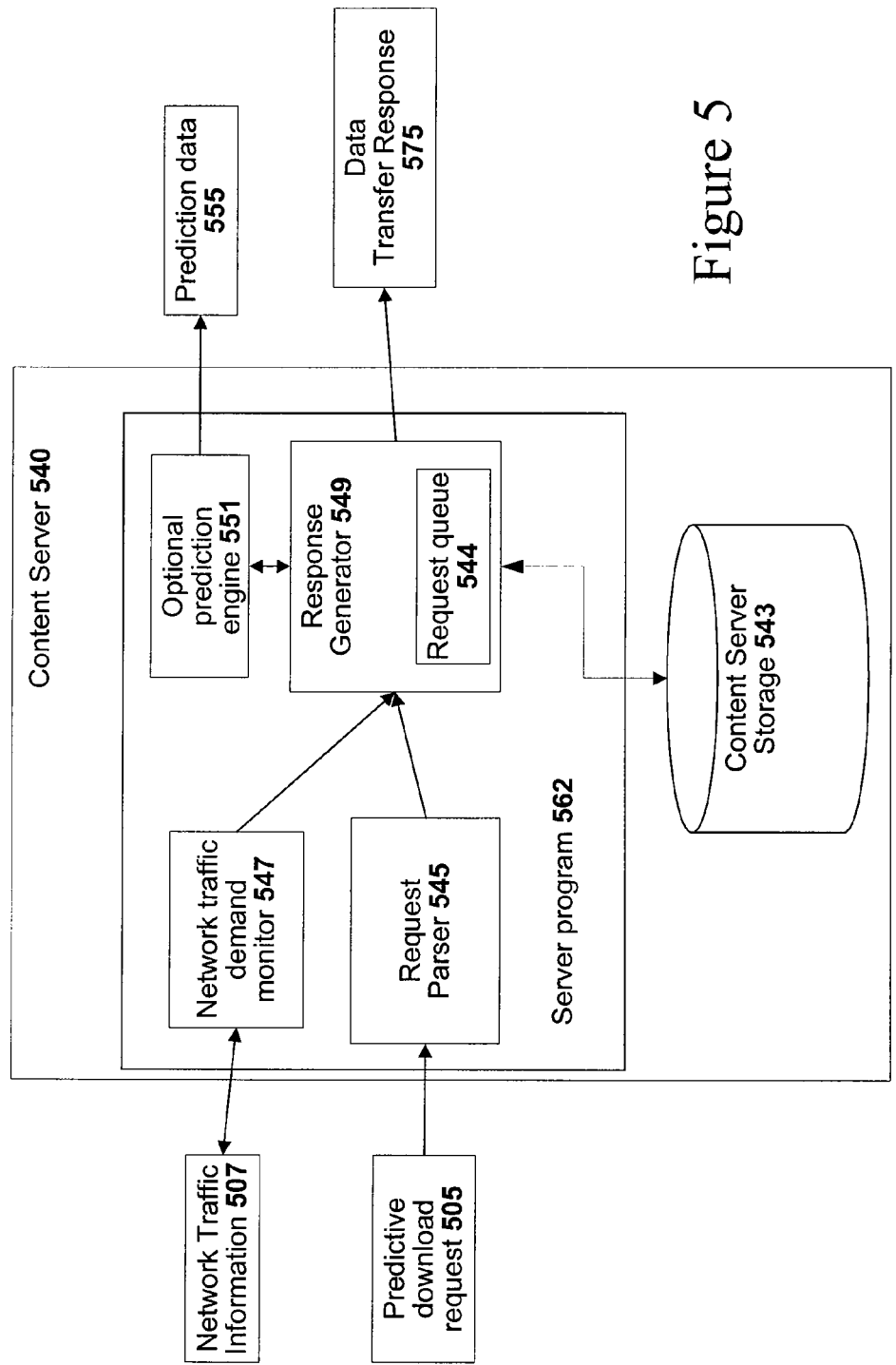
FIG. 5 illustrates a block diagram of one embodiment of a server program that interoperates with the client caching programs.

FIG. 5 illustrates a block diagram of one embodiment of a server program 462 that interoperates with the client caching programs. The server program 562 may includes a network traffic demand monitor 547 that monitors network traffic. The network traffic demand monitor 547 may use an optional protocol to communicate with other network demand monitors within the network to share traffic information. When server program 562 receives a request, a request parser 545 is used to determine the type of request. Normal data requests will be handled in a normal manner.

When request parser 545 specifies that a predictive download request for cache data (as opposed to a normal request) has been received, a response generator 549 may consult the network traffic demand monitor 547 before issuing a response. In one embodiment, the response generator 549 may not respond to the predictive download request if there is currently too much traffic. Such a predictive download request may be placed onto a request queue 544 and handled at a later time when the network traffic demand monitor 547 specifies that there is a low traffic period (a free period).

The network activity monitor 547 may performs one or more of the following tasks in order to monitor traffic and develop an internal traffic model:
- Requests network traffic information from other network server programs.
- Continuously monitors traffic between the server and an edge network node.
- Maintain an internal historical log of traffic seen locally.
- Uses the internal historical log to create an internal schedule of expected low activity periods.
- Requests an external schedule of expected low activity periods from a central server within the network or in another network.
- Monitors actual data transfer rates and compares these actual data transfer rates to "ideal" data transfer rates to verify low activity periods.
- Adjusts low activity period log data based on actual data transfer data.

In addition to monitoring network traffic and building a traffic model, the network traffic demand monitor 547 may cause the server program 562 to initiate some independent activities. For example, the network traffic demand monitor 547 may cause the server program 562 to initiate data transfers based on external data transfer requests from a central server within the network or in another network. Similarly, the network traffic demand monitor 547 may cause the server program 562 to initiate data transfers based on its internally developed and stored low activity schedule.

The server program 562 may include an optional prediction engine 551 that monitors the requests received from various client programs and collects usage data. This usage data may be analyzed to determine particular aspects of the content on the server that client programs have frequently requested and other useful information. This usage data may be sent back to the client caching programs in order to improve the performance of prediction engines on those client caching programs. In some embodiments, the server program 562 itself may initiate data transfers to client caching programs during low demand periods.

In different embodiments the optional prediction engine 551 is implemented to performs one or more of the following tasks:
- Maintain an internal log of all data requested by client programs. This may include both normal client programs and client caching programs.
- Analyze the internal log data to create an annotated list of data that is likely to be requested by client programs in the future. The annotations may describe the type of data needed, the frequency of requests, the actual use of that data in the past, and other parameters that help to structure the priority and importance of that information to the clients.
- Optionally communicate this annotated list to a specific originating server known as the prediction statistics server. The prediction statistics server aggregates lists from many systems. The prediction statistics server would optimally be located at a network location close to the other servers such as at an ISP's co-location facility.

Referring back FIG. 4, a prediction statistics server 435 is illustrated connected to a service provider network 420 that may receive statistics from server system 431 and 461. The prediction statistics server 435 collects the annotated lists and may analyze the collection of lists to help obtain more accurate predictions. The prediction statistics server 435 may then communicates the modified lists back to the server systems and client systems. The prediction statistics server 435 may also initiate data transfer requests based on the modified lists.

In addition to receiving information from server systems, the prediction statistics server 435 may also receive information from client systems. In one embodiment, this is performed by merely passively monitoring and sampling data request traffic from client systems seen on the local network connection. Furthermore, the predictive engine in client caching programs may receive modified lists from the prediction statistics server 435, analyze the modified lists, and use the information to improves client caching program's own future predictions. The predictive engine in client caching programs may also receive updated prediction algorithms as improved prediction algorithms are developed.

A Third Embodiment

In a third embodiment, the sophistication of the network activity monitor may "be" reduced or completely removed from the client caching program in a client system. Instead of heavily relying on the network activity monitor, the client caching program issues predictive downloading requests for cache data regardless of the expected network traffic. However, these predictive downloading data requests are issued as low priority data requests as set forth in the co-pending patent application titled "SYSTEM AND METHOD FOR NETWORK OPTIMIZATION BY MANAGING LOW PRIORITY DATA TRANSFERS" with Ser. No. 12/370,328 filed on the same date of this document. These low priority data requests may be marked with a new protocol and with Quality of Service (QoS) bits set to indicate low priority. These low priority predictive downloading data requests may be sent at any time with the foreknowledge that such low priority predictive downloading data requests are likely to be either dropped or delayed for a very long period.

A First World Wide Web Application Embodiment

One of the most popular applications on the global internet is the World Wide Web (WWW). The WWW allows internet users with web browsers to contact web servers in order to access and view web pages filled with multi-media and formatted in a Hyper-Text Mark-up Language (HTML). The web browsers and web servers communicate in an application protocol known as Hyper-Text Transport Protocol (HTTP). In one embodiment of the present disclosure, a modified protocol based on Hyper-Text Transport Protocol (HTTP) was designed to optimize network performance. Note that this example described with reference to HTTP is only one network application of the many that may be modified to use the teachings of the present disclosure. Many different application protocols such as FTP, SMTP, custom distributed computing protocols, and others may be modified in a similar manner to further improve network performance.

The normal Hyper-Text Transport Protocol (HTTP) uses a request/response process to exchange information between a web client and web server. The request/response process of the Hyper-Text Transport Protocol (HTTP) was modified to include a delayed data transfer request (DDTR) type and a delay-or-drop data transfer request (DoDTR) type. Specifically, HTTP messages are modified with several HTTP headers that provide for long-term delays in data transfers and for complete message drops. The extended version the Hyper-Text Transport Protocol (HTTP) extends normal HTTP in the following ways:

(1) The HTTP request messages are tagged with an additional optional header to indicate the protocol extension. In HTTP, an X-extension may be used such as an "X-tomnica-prefetch:" header. The added X-header may specify if the request is a data transfer request (DDTR) or a delay-or-drop data transfer request (DoDTR). Note that using the optional X-header of the HTTP protocol allows the modified protocol to be backwards compatible with existing web servers since existing web servers will ignore the added extension and respond to the requests as ordinary HTTP requests.

(2) The HTTP requests and responses may be tagged with low priority quality of service (QOS) indicators. For example, the DiffServ, ECN, Traffic Class, and/or Flow Label bits on a data packet may be set as appropriate to indicate low priority. In this manner, a web publisher's router (and any other downstream routers using the same QOS features) will treat these packets as low priority packets that may be delayed or dropped if traffic congestion is encountered.

(3) A special HTTP reply message may be used when a web publisher is too busy to process low priority requests (such as predictive downloads). The response message may contain a response status code that indicates the server is busy and when the requester should try again to fetch this data. Such a response code may be implemented in a number of different ways. For example, a new HTTP status code may be created for this feature. In other embodiments, an additional code may be added to an existing response code. For example, an additional extension may be added to a response message that uses Microsoft's 449 "retry with" extension or the 509 "bandwidth limit exceeded" response.

A Second World Wide Web Application Embodiment

In an alternate embodiment, the HTTP protocol is modified into a new protocol called HyperText Transport Protocol Delayed or HTTPD. The modifications are implemented by using the 'method token' of the HTTP protocol. The method token indicates the method to be performed on the resource (server) identified by the request. In HTTP, the method token is defined as follows:

Method="OPTIONS"|"GET"|"HEAD"|"POST"|"PUT"| "DELETE"|"TRACE"|"CONNECT"|extension-method where extension-method=additional tokens created for HTTPD For HTTPD, the extension-method is used to create a set of new methods such as DGET (Delayed GET), DHEAD (Delayed HEAD), DPUT (Delayed PUT) that are sufficient to create request messages for DDTRs and DDTs. DoDTRs and DoDTs are handled with these same methods but will have different header information to indicate the drop option.

To interoperate with older systems that do not understand the HTTPD protocol, a proxy may be used. For example, a client system might issue a DGET for a delayed data request. An intermediary proxy would receive the DGET and issue a standard GET that will be received by the destination server. The proxy would receive a PUT message from the server and translate that into a DPUT for the client system. The proxy may delay the issuance of the translated DGET or PUT messages depending on network traffic. This case is particularly important when setting up a proxy on an edge server on an internet service provider's network. In these cases, the internal backbone may be able to handle the traffic but the last mile near the client system may be saturated.

After issuing a low priority predictive request, the client caching program then begins to wait for a response (if the network connection is still open). If the network connection had been closed (such as a DSL line the drops its connection), the client caching program may reissue the low priority predictive download request at periodic intervals until it receives either a standard data response or a low priority response from the originating server. In either case the client caching program extracts the data from the response and stores the data in the data cache client system.

In all these embodiments, when the network terminal device client application initiates the actual data request at the time that the client application needs it, the prediction engine delivers the already stored predictively downloaded data.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim is still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method of communicating information on a data network coupled to a client system, said method comprising:
   generating a prediction for an identified data object to cache that would likely prevent a future network request from said client system examining a log of previously fetched data or selecting a data object referenced by an existing data object in a local data cache;
   determining a current state of network traffic conditions on said data network by consulting at least one data traffic model for free period; and
   issuing a delayed predictive data request to cache said identified data object when said current state of network traffic conditions is favorable, said delayed predictive data request being marked as a request whose response may be delayed until network traffic conditions are favorable.

2. The method of communicating information on a data network coupled to a client system as set forth in claim 1, said method further comprising:
   receiving a rejection of said delayed predictive data request or timing out after not receiving a response to said delayed predictive data request after a specified time period; and
   responding to said rejection or said timing out by re-issuing said delayed predictive data request.

3. The method of communicating information on a data network coupled to a client system as set forth in claim 1, said method further comprising:
   receiving a response with said identified data object in said client system;
   storing said identified data object in a local data cache.

4. The method of claim 1, said method further comprising:
   receiving said at least one data traffic model from a server coupled to said data network.

5. The method of claim 1, wherein said delayed predictive data request includes a first application layer protocol message marked to indicate said delayed predictive data request as a type of request whose response may be delayed until said network traffic conditions are favorable, the method further comprising:
   generating a standard data request including a second application layer protocol message of the same application layer protocol as said first application layer protocol message, said second application layer protocol message being unmarked to indicate that said standard data request is to be handled in a normal manner.

6. The method of claim 5, wherein said first application layer protocol message comprises a hypertext transfer protocol message tagged with an optional header or a method token to indicate said delayed predictive data request may be delayed.

7. The method of claim 6, wherein said delayed predictive data request includes an Internet layer packet encapsulating said first application layer message, said Internet layer packet being tagged with one or more low priority quality of service indicators selected from the group consisting of a Traffic Class bit and a Flow Label bit.

8. A client computer system coupled to a data network, said client computer system comprising:
   a network interface hardware for coupling said client computer system to said data network;
   a prediction engine, said prediction engine generating a prediction for an identified data object to cache that would likely prevent a future network request from said client system by examining a log of previously fetched data or selecting a data object referenced by an existing data object in a local data cache;
   a network activity monitor, said network activity monitor determining a current state of network traffic conditions on said data network by consulting at least one data traffic model for free period; and
   a data request handler, said data request handler issuing a delayed predictive data request to cache said identified data object on said data network when said current state of network traffic conditions is favorable, said delayed predictive data request being marked as a request whose response may be delayed until network traffic conditions are favorable.

9. The client computer system coupled to a data network as set forth in claim 8 wherein said network activity monitor receives a network traffic report from a network traffic device that collects network traffic information and generates said network traffic report, and said network activity monitor creates said at least one data traffic model from said network traffic report.

10. The client computer system coupled to a data network as set forth in claim 8 wherein said data request handler responds to a rejection of said delayed predictive data request or timing out after not receiving a response to said delayed predictive data request after a specified time period by re-issuing said delayed predictive data request.

11. The client computer system coupled to a data network as set forth in claim 8 wherein said data request handler receives a response with said identified data object and stores said identified data object in a local data cache.

12. The client computer system coupled to a data network as set forth in claim 8 wherein said network activity monitor receives said at least one data traffic model from a server coupled to said data network.

13. The client computer system coupled to a data network as set forth in claim 8, wherein said delayed predictive data request includes a first application layer protocol message marked to indicate said delayed predictive data request as a type of request whose response may be delayed until said network traffic conditions are favorable, said data request handler further issuing a standard data request including a second application layer protocol message of the same application layer protocol as said first application layer protocol message, said second application layer protocol message being unmarked to indicate that said standard data request is to be handled in a normal manner.

14. The client computer system coupled to a data network as set forth in claim 13, wherein said first application layer protocol message comprises a hypertext transfer protocol message tagged with an optional header or a method token to indicate said delayed predictive data request may be delayed.

15. The client computer system coupled to a data network as set forth in claim 14, wherein said delayed predictive data request includes an Internet layer packet encapsulating said first application layer message, said Internet layer packet being tagged with one or more low priority quality of service indicators selected from the group consisting of a Traffic Class bit and a Flow Label bit.

16. A method for a client system to predictively download information from a server system over a data network, said method comprising:

determining a free period when network activity is low or expected to be low by consulting at least one data traffic model;

predicting a data that should be downloaded from said server system and cached locally to reduce a future data request to said server system by examining a log of previously fetched data or selecting a data object referenced by an existing data object in a local data cache;

issuing a predictive download data request for said data to said server system at said free period when a current state of network traffic conditions is favorable, said predictive download data request including a first application layer protocol message marked to indicate that said predictive download data request may be discarded or delayed by said server system until another free period, determined by said server system, when network activity is low or expected to be low; and issuing a standard data request including a second application layer protocol message of the same application layer protocol as said first application layer protocol message, said second application layer protocol message being unmarked to indicate that said standard data request is to be handled in a normal manner.

17. The method of claim 16, said method further comprising:

re-issuing said predictive download data request after receiving a rejection of said predictive download data request or timing out without receiving a response to said predictive download data request.

18. The method of claim 16, wherein said first application layer protocol message comprises a hypertext transfer protocol message tagged with an optional header or a method token to indicate said predictive download data request may be delayed.

19. The method of claim 18, wherein said predictive download data request includes an Internet layer packet encapsulating said first application layer protocol message, said Internet layer packet being tagged with one or more low priority quality of service indicators selected from the group consisting of a Traffic Class bit and a Flow Label bit.

* * * * *

UNITED STATES PATENT AND TRADEMARK OFFICE
CERTIFICATE OF CORRECTION

| | |
|---|---|
| PATENT NO. | : 8,892,720 B2 |
| APPLICATION NO. | : 12/370462 |
| DATED | : November 18, 2014 |
| INVENTOR(S) | : Raul Diaz |

Page 1 of 1

It is certified that error appears in the above-identified patent and that said Letters Patent is hereby corrected as shown below:

In the Claims

Column 15
Line 11, Claim 1, where "system examining" should read --system by examining--.

Signed and Sealed this
Tenth Day of March, 2015

Michelle K. Lee
*Deputy Director of the United States Patent and Trademark Office*